(12) United States Patent
Tanaka et al.

(10) Patent No.: US 9,446,766 B2
(45) Date of Patent: Sep. 20, 2016

(54) TRAVEL CONTROL DEVICE AND TRAVEL CONTROL SYSTEM

(71) Applicant: Hitachi Automotive Systems, Ltd., Hitachinaka-shi, Ibaraki (JP)

(72) Inventors: Yuya Tanaka, Hitachinaka (JP); Taisetsu Tanimichi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/764,501

(22) PCT Filed: Feb. 1, 2013

(86) PCT No.: PCT/JP2013/052307
§ 371 (c)(1),
(2) Date: Jul. 29, 2015

(87) PCT Pub. No.: WO2014/118962
PCT Pub. Date: Aug. 7, 2014

(65) Prior Publication Data
US 2015/0360688 A1    Dec. 17, 2015

(51) Int. Cl.
*B60W 30/14* (2006.01)
*B60W 10/06* (2006.01)
(Continued)

(52) U.S. Cl.
CPC ............ *B60W 30/143* (2013.01); *B60W 10/06* (2013.01); *B60W 10/188* (2013.01);
(Continued)

(58) Field of Classification Search
CPC ........... B60W 30/143; B60W 30/188; B60W 10/06; B60W 10/188; B60W 2520/00; B60W 2520/20; G01C 21/34; G01C 21/3469; G08G 1/09

USPC .......................................................... 701/93
See application file for complete search history.

(56) References Cited

U.S. PATENT DOCUMENTS

| 5,610,821 A | 3/1997 | Gazis et al. |
| 2008/0012726 A1* | 1/2008 | Publicover ............. G08G 1/095 340/932 |

(Continued)

FOREIGN PATENT DOCUMENTS

| JP | 8-235496 A | 9/1996 |
| JP | 2008-129804 A | 6/2008 |

(Continued)

OTHER PUBLICATIONS

International Search Report dated Mar. 12, 2013 with English Translation (Two (2) pages).

*Primary Examiner* — McDieunel Marc
*Assistant Examiner* — James E Stroud
(74) *Attorney, Agent, or Firm* — Crowell & Moring LLP

(57) ABSTRACT

A travel control device includes a target vehicle-speed calculation unit that includes a target vehicle-speed pattern adjustment processing unit generating a target vehicle-speed pattern based on a route passing speed pattern which is a passing vehicle-speed pattern within a certain distance generated in consideration of traffic congestion information. The travel control device also includes an evaluation value calculation unit calculating an evaluation value based on a horizon length and the target vehicle-speed pattern. The horizon length representing the time taken until a vehicle arrives at an ultimate point generated in consideration of information on prospective traffic congestion which can occur in the future.

13 Claims, 14 Drawing Sheets

(51) Int. Cl.
*B60W 10/188* (2012.01)
*B60W 30/188* (2012.01)
*G08G 1/09* (2006.01)
*G01C 21/34* (2006.01)

(52) U.S. Cl.
CPC ........... *B60W 30/188* (2013.01); *G01C 21/34* (2013.01); *G01C 21/3469* (2013.01); *G08G 1/09* (2013.01); *B60W 2520/00* (2013.01); *B60W 2550/20* (2013.01)

(56) References Cited

U.S. PATENT DOCUMENTS

| | | | |
|---|---|---|---|
| 2010/0042282 | A1 | 2/2010 | Taguchi et al. |
| 2010/0149020 | A1* | 6/2010 | Arnold .................. G01S 13/48 342/90 |
| 2011/0184605 | A1* | 7/2011 | Neff ..................... G05D 1/0255 701/25 |
| 2015/0057907 | A1* | 2/2015 | Rebhan ............. B60W 50/0097 701/93 |
| 2015/0266455 | A1* | 9/2015 | Wilson ................ G08G 1/0112 701/93 |
| 2015/0360706 | A1* | 12/2015 | Niinomi .............. B61L 27/0027 701/19 |
| 2016/0055750 | A1* | 2/2016 | Linder .................... G08G 1/16 340/905 |
| 2016/0082963 | A1* | 3/2016 | Slaton ................ B60W 30/143 701/93 |
| 2016/0097648 | A1* | 4/2016 | Hannah .............. G01C 21/3415 701/118 |

FOREIGN PATENT DOCUMENTS

| | | |
|---|---|---|
| JP | 2009-070101 A | 4/2009 |
| JP | 2012-026787 A | 2/2012 |

* cited by examiner

TRAVEL CONTROL DEVICE AND TRAVEL CONTROL SYSTEM

TECHNICAL FIELD

The present invention relates to a travel control device and a travel control system taking traffic flow into consideration.

BACKGROUND ART

In order to reduce the energy consumption of vehicles and to improve convenience for a driver, a system in which an alternate route having no traffic congestion is calculated based on road traffic information so as to be presented to a driver has been proposed. However, when multiple drivers travel the route having no traffic congestion in accordance with the presented route, there is a possibility of concentration of vehicles in the route, thereby causing an occurrence of traffic congestion again in the other route which is presented in order to ease the traffic congestion, and thus, the system is not a fundamental solution to the optimization of traffic flow and minimization of the energy consumption of the vehicles.

PTL 1 discloses that an optimal route for the vehicle is determined by using information on a current traffic flow received from each of the vehicles. In order to achieve the optimization of traffic flow, after the route is determined, if an unpredicted change in the traffic flow is detected, the system functions to designate a new optimal route for the vehicle again replacing the old route.

PTL 2 discloses a function of selecting the optimal route performed by using altitude information of a road map in order to minimize the energy consumption of vehicles.

CITATION LIST

Patent Literature

PTL 1: JP-A-8-235496
PTL 2: JP-A-2012-26787

SUMMARY OF INVENTION

Technical Problem

In PTL 1, since a system functions to detect an unpredicted change in traffic flow and to present a new optimal route again, it is possible to avoid traffic congestion which can occur in the future. However, there is no criterion for the duration of the future time period when adopting prediction methods of traffic flow. Therefore, when traveling the newly presented route, the possibility that traffic congestion will occur in the future is not taken into consideration, and the vehicle may encounter traffic congestion again. In addition, selecting a new optimal route may lead to an increase of a traveling distance or fluctuation in a traveling speed, thereby ultimately increasing the energy consumption of the vehicle.

In PTL 2, a system functions to select a route in which the energy consumption of the vehicle is reduced by using altitude information of a road map. However, traffic flow is not taken into consideration. Therefore, when there is an occurrence of traffic congestion in the selected route, the energy consumption of the vehicle may be deteriorated.

As described above, in the related art, at least the energy consumption of the vehicles and traffic flow are not generally considered. Therefore, any one of the energy consumption and traffic flow may be deteriorated significantly, thereby leading to a problem.

As described above, an object of the present invention is to provide a travel control device in which the optimization of traffic flow and minimization of the energy consumption of vehicles are compatible with each other.

Solution to Problem

In order to solve the problems, a travel control device according to the present invention includes: a target vehicle-speed calculation unit that includes a target vehicle-speed pattern adjustment processing unit generating a target vehicle-speed pattern based on a route passing speed pattern which is a passing vehicle-speed pattern within a certain distance generated in consideration of traffic congestion information, and an evaluation value calculation unit calculating an evaluation value based on a horizon length and the target vehicle-speed pattern, the horizon length representing the time taken until a vehicle arrives at an ultimate point generated in consideration of information on prospective traffic congestion which can occur in the future; and a target control volume computation unit that calculates control volume of controlling the vehicle based on the evaluation value.

A travel control system according to the present invention includes: an information processing apparatus that includes a shortest route calculation processing unit predicting prospective traffic congestion information based on an input route of a vehicle and current traffic congestion information and calculating optimal routes for all vehicles so as to minimize the energy consumption and arrival times at destinations of all the vehicles which pass through a prospective traffic congestion occurrence section based on the prospective traffic congestion information, a horizon length calculation processing unit calculating a horizon length which represents the time taken until the vehicle arrives at an ultimate point generated in consideration of the prospective traffic congestion information which can occur in the future based on the optimal route, and a route passing vehicle-speed calculation processing unit calculating a route passing vehicle-speed pattern based on the optimal route and the horizon length in a case of passing through a predetermined route; and a travel control device that includes a target vehicle-speed calculation unit having a target vehicle-speed pattern adjustment processing unit which generates a target vehicle-speed pattern based on a route passing speed pattern and an evaluation value calculation unit which calculates an evaluation value based on the horizon length and the target vehicle-speed pattern, and a target control volume computation unit calculating control volume for controlling the vehicle based on the evaluation value.

Advantageous Effects of Invention

It is possible to provide a travel control device in which the optimization of traffic flow and minimization of the energy consumption of vehicles are compatible with each other.

DESCRIPTION OF EMBODIMENTS

Hereinafter, the present invention will be described with reference to the drawings.

EXAMPLE 1

Figure 1:
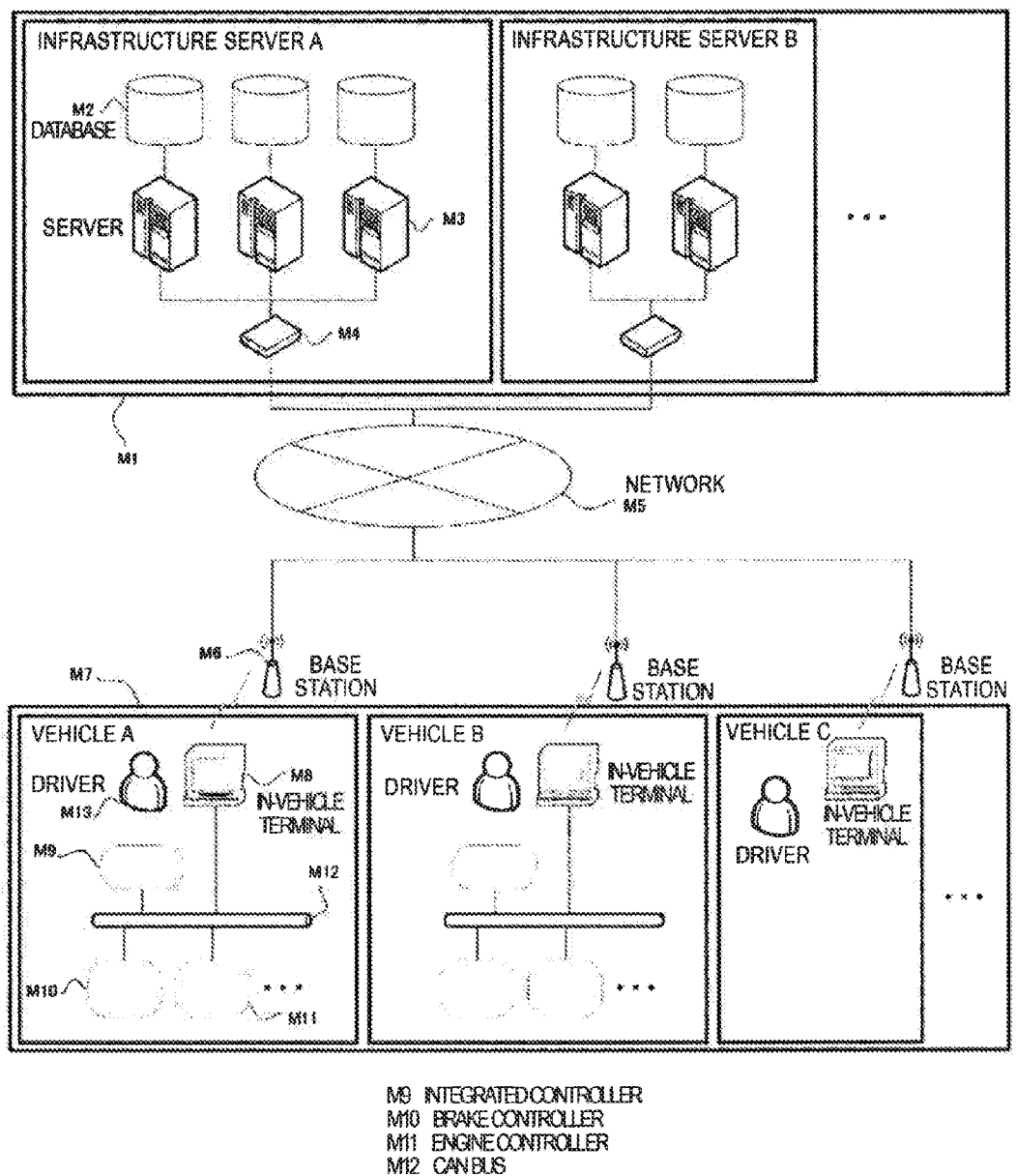
FIG. 1 is a diagram illustrating one configuration example of a travel control system of the present invention.

FIG. 1 illustrates a configuration of a travel control system of the present invention. The travel control system is configured to include an information processing apparatus on an infrastructure server side and a travel control device on a vehicle side.

The configuration is based on the premise that multiple vehicles M7 (vehicles A to C and the like in FIG. 1) and multiple infrastructure servers M1 (the infrastructure servers A and E and the like in FIG. 1) communicate with each other via a network M5. In the multiple vehicles M7, an in-vehicle terminal M8 is held in each of the vehicles A to C in order to have access to the multiple infrastructure servers M1. As a driver M13 on the vehicle operates the in-vehicle terminal M8, an estimated departure time, a destination, and a route leading to the destination are determined.

Figure 3:
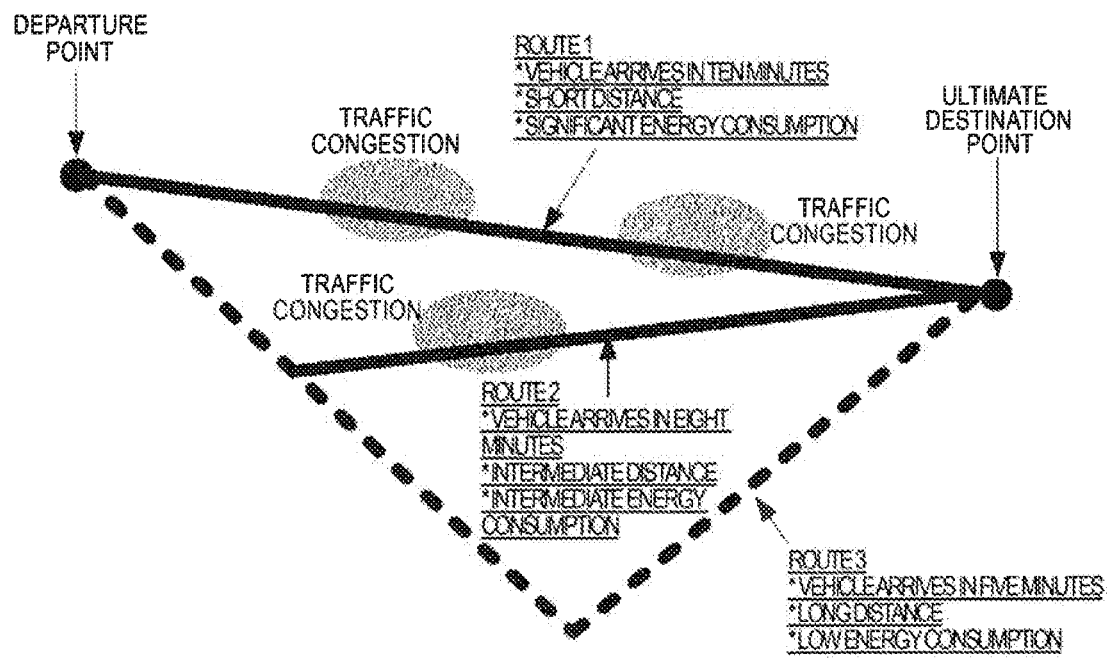
FIG. 3 is a diagram illustrating an optimal route of the travel control system of the present invention.

As illustrated in FIG. 3, here, the route denotes multiple routes connecting a departure point of traveling of the driver M13 to an ultimate destination point. In addition, the estimated departure time, the destination, and the route leading to the destination acquired from the in-vehicle terminal M8 are collected by a certain base station M6 through radio communication and the data is transmitted to any one of servers M3 in the apparatus on the infrastructure server side via a switching system M4 through the network M5. Moreover, the servers M3 respectively hold multi-purpose databases M2 for storing data acquired from the in-vehicle terminals M8.

As the internal configuration of the multiple vehicles M7, information calculated in the apparatus on the infrastructure server side is acquired from the in-vehicle terminal M8, and information volume for an integrated controller M9 to control the vehicle is computed through a CAM bus M12. The information volume to control the vehicle is transmitted to a brake controller M10 and an engine controller M11 through the CAN bus M12, thereby controlling the multiple vehicles M7.

Figure 2:
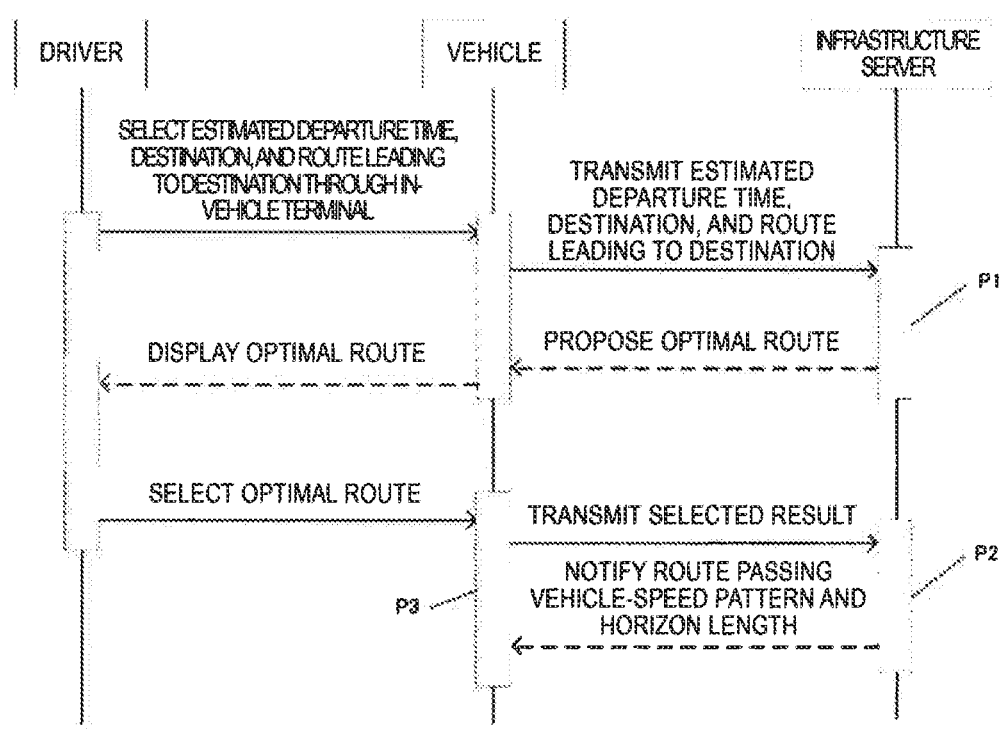
FIG. 2 is a diagram illustrating an example of a sequence of the travel control system of the present invention.

FIG. 2 illustrates a flow of the travel control system in which a driver selects a destination and the vehicle-speed of the vehicle is controlled.

First, with respect to the in-vehicle terminal M8 of the vehicle M7, the driver M13 selects an estimated departure time, a destination, and a route leading to the destination. The vehicle M7 transmits information to the apparatus on the infrastructure server side based on the estimated departure time received from the driver M13, the destination, and the route leading to the destination. The reason for proceeding with such a procedure is to be able to design routes so as to ease traffic congestion by causing multiple drivers to register the routes in the apparatus on the infrastructure server side in advance.

The infrastructure servers M1 calculate optimal routes in which traffic congestion is eased and the overall energy efficiency of vehicles is achieved, based on the estimated departure times, the destinations, and the routes leading to the respective destinations of the multiple drivers (P1), thereby proposing the calculated result to each driver on the vehicle side as the optimal route. The proposed optimal route is displayed for the driver M13 through the in-vehicle terminal M8 on the vehicle side.

Here, the optimal route denotes the route illustrated in a dotted line in FIG. 3. In the example of FIG. 3, there are three routes connecting the departure point of traveling of a driver and the ultimate destination point. A route 1 passes through two traffic congestion sections, thereby having 10 minutes of the arrival time which is long. The distance is short but the energy consumption is significant. A route 2 passes through one traffic congestion section, thereby having 8 minutes of the arrival time which is shorter than that of the route 1. The distance and the energy consumption are at intermediate levels. In addition, a route 3 has no traffic congestion section in the route, thereby having 5 minutes of the arrival time which is the shortest. The distance is long but the energy consumption is low. In consideration of the traffic congestion, the route having the shortest arrival time is the route 3. Despite the longest travel distance, the route 3 having the shortest arrival time has the low energy consumption. Therefore, in this case, the route 3 is referred to as the optimal route.

Returning to FIG. 2, the driver M13 confirms the optimal route transmitted from the infrastructure servers M1 through the in-vehicle terminal M8, thereby selecting whether or not to travel the optimal route. When the optimal route is selected, the vehicle M7 transmits the selected result to the infra structure servers M1.

The infrastructure servers M1 calculate a route passing vehicle-speed pattern and a horizon length which are required when traveling the optimal route (P2), thereby notifying the vehicle M7 of the calculated result. The vehicle M7 calculates control volume so as to achieve the optimal energy consumption of the vehicle, based on the route passing vehicle-speed pattern and the horizon length (P3), thereby starting control of the vehicle.

Figure 4:
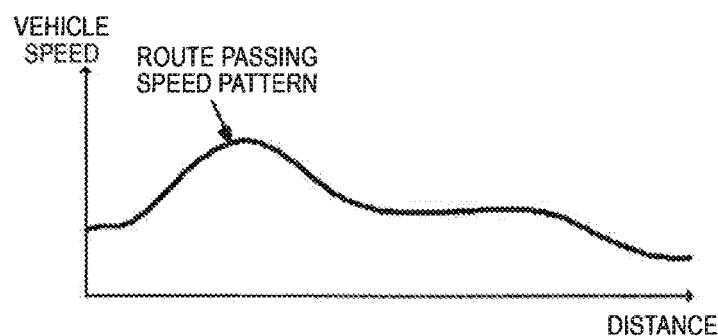
FIG. 4 is a diagram illustrating an example of a route passing speed pattern of the present invention.

Here, the route passing vehicle-speed pattern denotes a continuous passing vehicle-speed pattern recommended to the driver, within a certain distance illustrated in FIG. 4. The route passing vehicle-speed pattern is a criterion when driving the vehicle so as to cause all the vehicles to have the low energy consumption and short traveling time. By traveling the proposed route, it is possible to ease traffic congestion and to travel to the destination through the low energy consumption route. In addition, the horizon length denotes the time taken until the vehicle arrives at the ultimate point, in information on traffic congestion which can occur in the future in the optimal route illustrated in FIG. 5.

Descriptions will be given regarding an example of the internal configuration of the multiple vehicles M7 and the multiple infrastructure servers M1 illustrated in FIG. 1 in the travel control system of FIG. 6.

Since the apparatus on the vehicle side takes the optimization of the overall traffic flow into consideration, it is assumed that there are multiple vehicles as illustrated in FIG. 1. In addition, it is assumed that there are multiple infrastructure servers as well in the viewpoint of load distribution.

Figure 6:
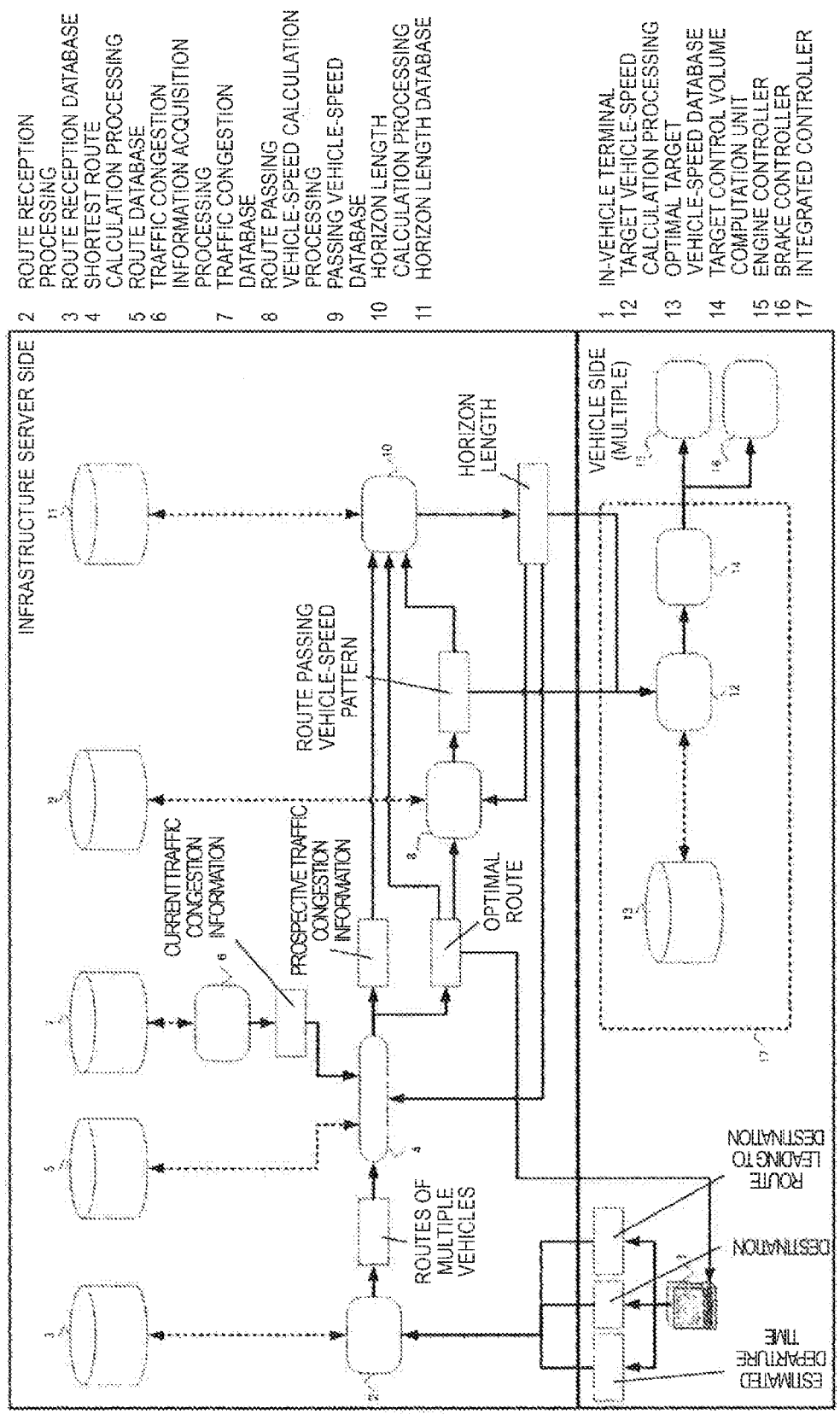
FIG. 6 is a diagram illustrating a detailed configuration example of the travel control system including an infrastructure server of the present invention.

As illustrated in the configuration of the vehicles M7 in FIG. 1, the apparatus on the vehicle side in FIG. 6 includes an in-vehicle terminal 1, an integrated controller 17, an engine controller 15, and a brake controller 16. The integrated controller 17 in FIG. 6 includes target vehicle-speed calculation processing 12, an optimal target vehicle-speed database 13, and a target control volume computation unit 14.

The in-vehicle terminal 1 performs roles to register the estimated departure time, the destination, and the route leading to the destination of a driver and to acquire the optimal traveling route from the apparatus on the infrastructure server side so as to display the acquired route to the driver. In addition, in the target vehicle-speed calculation processing 12 on the vehicle side, the route passing vehicle-speed pattern and the horizon length generated on the infrastructure server side are input, and an optimal target vehicle-speed pattern is computed so as to cause the energy consumption of the vehicles to be minimized. The optimal target vehicle-speed pattern computed herein is registered in the optimal target vehicle-speed database 13 and is used when controlling the vehicle.

The target control volume computation unit 14 computes the control volume such as throttle-opening and brake fluid pressure based on the optimal target vehicle-speed pattern generated in the target vehicle-speed calculation processing 12. The control volume is transmitted to each of the engine controller 15 and the brake controller 16, thereby controlling the vehicle.

Functions of processing on the infrastructure server side illustrated in FIG. 6 such as route reception processing 2, shortest route calculation processing 4, traffic congestion information acquisition processing 6, route passing vehicle-speed calculation processing 8, and horizon length calculation processing 10 are arranged in any one of the servers M3 inside the infrastructure server in FIG. 1. In addition, each of databases such as a route reception database 3, a route database 5, a traffic congestion database 7, a passing vehicle-speed database 9, and a horizon length database 11 corresponds to any one of the databases M2 in FIG. 1.

For example, the functions of processing arranged in the servers M3 may be dispersed into an infrastructure server A and an infrastructure server B. The databases M2 may also be dispersed into the infrastructure server A and the infrastructure server B. However, when being dispersed, due to a relationship in a flow between the functions of processing and the items of data, communication is performed via the switching system M4 and the network M5. Accordingly, there is an occurrence of delay resulting from the communication, and thus, there is a need to design the configuration of the infrastructure server in accordance with the real-time elements in control of the vehicles M7.

The apparatus on the infrastructure server side in FIG. 6 is configured to include the route reception processing 2; the route reception database 3 which holds the estimated, departure time, the destination, and the route leading to the destination of the vehicle received through the route reception processing 2; the shortest route calculation processing 4; the route database 5 which holds the optimal route for the vehicle to travel and prospective traffic congestion information; the traffic congestion information acquisition processing 6; the traffic congestion database 7 which holds current traffic congestion information in multiple road sections; the route passing vehicle-speed calculation processing 8; the passing vehicle-speed database 9 which holds the route passing vehicle-speed pattern for each route through which the vehicle travels; the horizon length calculation processing 10; and the horizon length database 11 which holds the horizon length.

Here, the traffic congestion information is based on the premise that information such as a mean section-transit time is included. The current traffic congestion information includes a current mean section-transit time and a past mean section-transit time. The past mean section-transit time represents a history of each mean transit time in a particular time zone. Since the past mean section-transit time is necessary in order to predict the prospective mean section-transit time, the past mean section-transit time is included in the current traffic congestion information.

Figure 12:
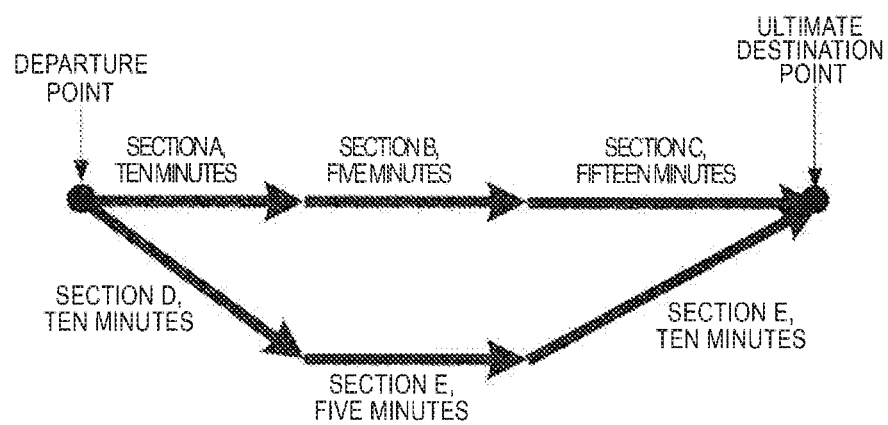
FIG. 12 is a diagram illustrating an example of a mean section-transit time of the present invention.

As illustrated in FIG. 12, the mean section-transit time represents a current mean time taken by a vehicle to pass through one section which is acquired by dividing a route from the departure point to the ultimate destination point into multiple sections. For example, in a case of a section A, the vehicle can pass through the section A for average of 10 minutes from the departure point to a section B.

The route reception processing 2 receives the estimated departure times, the destinations, and the routes leading to the destinations which are input through the vehicle terminals 1 of the multiple vehicles, thereby holding the received data in the route reception database 3. The shortest route calculation processing 4 acquires the routes of the multiple vehicles from the route reception database 3 and predicts prospective traffic congestion based on the current traffic congestion information corresponding to the route acquired from the traffic congestion database 7, thereby outputting the prospective traffic congestion information. Then, the horizon length is acquired from the horizon length database 11, and the optimal routes for all the vehicles are calculated so as to minimize the energy consumption and arrival times at the destinations of all the vehicles which pass through a prospective traffic congestion occurrence section, thereby transmitting the calculated result to the vehicle terminals 1 of the multiple vehicles. The optimal route and the prospective traffic congestion information which are calculated for each vehicle are managed by the route database 5. The detailed descriptions regarding the shortest route calculation processing 4 will be given later with reference to FIGS. 9 and 10.

The route passing vehicle-speed calculation processing 8 calculates the route passing vehicle-speed pattern in a case where the vehicle passes through a predetermined route based on the optimal route computed by the shortest route calculation processing 4 and the horizon length calculated by the below-described horizon length calculation processing 10, thereby transmitting the calculated result to the apparatus on the vehicle side. The calculated route passing vehicle-speed pattern is managed by the passing vehicle-speed database 5.

The horizon length calculation processing 10 acquires the optimal route and the prospective traffic congestion information from the route database 5, acquires the route passing vehicle-speed pattern of the vehicle passing through the route from the passing speed database 9, and calculates the horizon length, thereby transmitting the calculated result to the apparatus on the vehicle side. The horizon length calculated for each vehicle is managed by the horizon length database 11 and is used by the route passing vehicle-speed calculation processing 8 as reference in order to calculate a succeeding route passing vehicle-speed pattern. The horizon length for the first route passing vehicle-speed calculation processing is calculated by using a certain predetermined horizon length.

Figure 5:
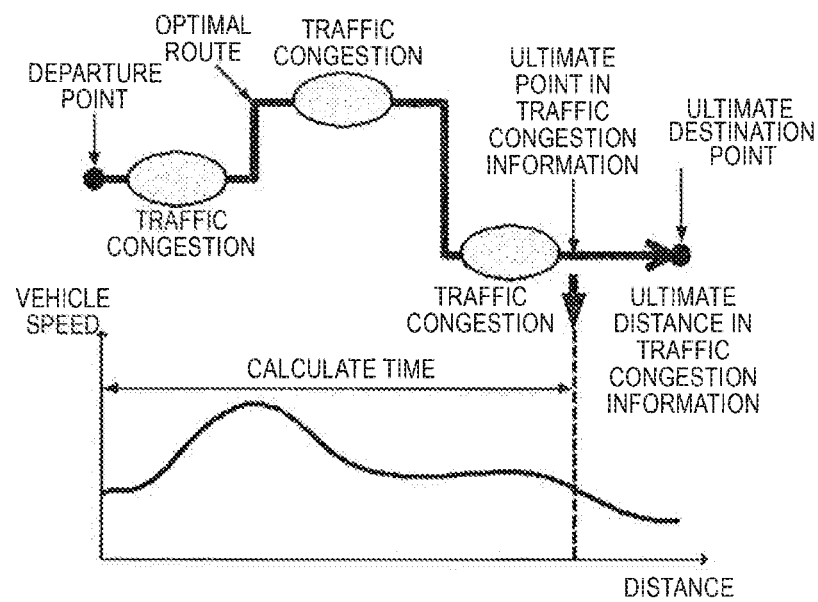
FIG. 5 is a diagram illustrating a method of calculating a horizon length performed by the travel control system of the present invention.

A method of calculating the horizon length will be described with reference to FIG. 5.

The horizon length is calculated through the horizon length calculation processing 10 on the infrastructure server side illustrated in FIG. 6. Based on the optimal route and the prospective traffic congestion information acquired from the route database 5 illustrated in an upper portion of FIG. 5, information on the ultimate point of the traffic congestion farthest from the departure point is searched for. Since the traffic congestion information is based on the premise of being the mean section-transit speed, it is determined that traffic congestion has occurred when there is a uniform mean section-transit speed. In a comparison between a past mean section-transit speed and a prospective mean section-transit speed, if the prospective mean section-transit speed is exceedingly lower than a certain level, it may be determined that there is traffic congestion.

Subsequently, by using the distance to the ultimate point in the traffic congestion information acquired from the vehicle and the route passing vehicle-speed pattern acquired from the passing vehicle-speed database 9, the time taken until the vehicle arrives at the ultimate point in the traffic congestion information is calculated, and time is referred to as the horizon length.

As described above, the present invention is configured to include the shortest route calculation processing 4 of predicting the prospective traffic congestion information based on the input route of the vehicle and the current traffic congestion information and calculating the optimal routes for all the vehicles so as to minimize the energy consumption and the arrival times at the destinations of ail the vehicles which pass through the prospective traffic congestion occurrence section based on the prospective traffic congestion information, the horizon length calculation processing 10 of calculating the horizon length which represents the time taken until the vehicle arrives at the ultimate point generated in consideration of the information on the prospective traffic congestion which can occur in the future based on the optimal route, and the route passing vehicle-speed calculation processing 8 of calculating the route passing vehicle-speed pattern based on the optimal route and the horizon length in a case of passing through a predetermined route, thereby controlling the vehicles based on the horizon length and the route passing vehicle-speed pattern which are acquired herein.

In this manner, since traffic congestion which can occur until the vehicle arrives at the ultimate destination is predicted, and the optimal route and the optimal target vehicle-speed are calculated, without designating the route again when the vehicle encounters unpredicted traffic congestion as disclosed in PTL 1, the possibility of arriving at the destination in accordance with the initially planned control is improved.

Figure 7:
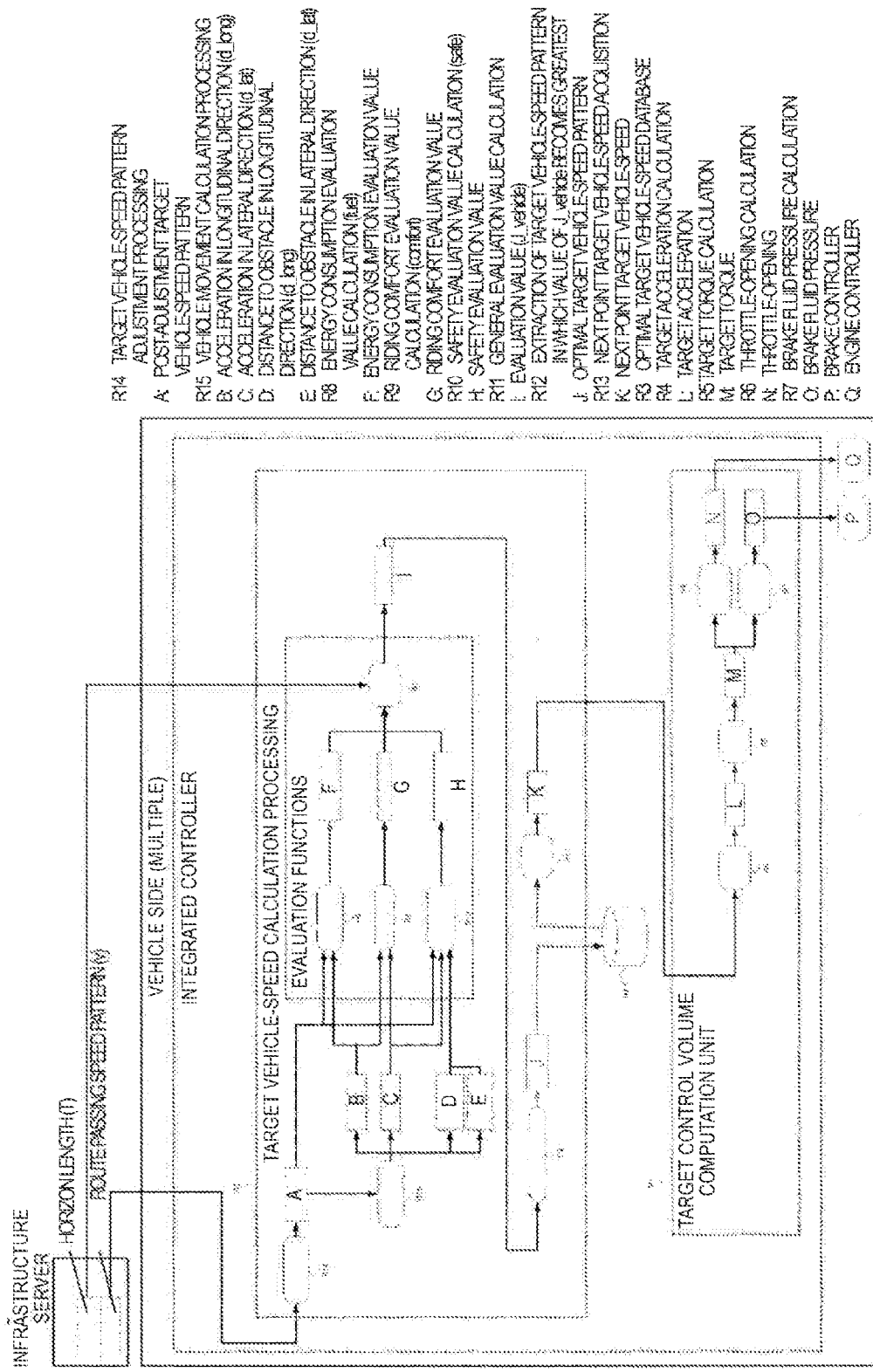
FIG. 7 is a diagram illustrating a detailed configuration example of an integrated controller for vehicles of the present invention.

FIG. 7 illustrates the detailed integrated controller 17 on the vehicle side in FIG. 6.

The integrated controller 17 in FIG. 7 includes a target control volume computation unit R1, target vehicle-speed calculation processing R2, and an optimal target vehicle-speed database R3. Moreover, the target control volume computation unit R1 includes a target acceleration calculation R4, a target torque calculation R5, a throttle-opening calculation R6, and a brake fluid pressure calculation R7. In addition, the target vehicle-speed calculation processing R2 includes target vehicle-speed pattern adjustment processing R14, vehicle movement calculation processing R15, an energy consumption evaluation value calculation R8, a riding comfort evaluation value calculation R9, a safety evaluation value calculation R10, a general evaluation value calculation R11, an extraction R12 of the target vehicle-speed pattern in which the value of J_vehicle becomes the greatest, and a next point target vehicle-speed acquisition R13. Particularly, in the target vehicle-speed calculation processing R2, the energy consumption evaluation value calculation R8, the riding comfort evaluation value calculation R9, the safety evaluation value calculation R10, and the general evaluation value calculation R11 are defined as having evaluation functions for obtaining an optimal vehicle movement.

The target vehicle-speed calculation processing R2 inputs the horizon length and the route passing vehicle-speed pattern calculated on the infrastructure server side, thereby out put ting the optimal target vehicle-speed pattern and a next point target vehicle-speed. The optimal target vehicle-speed pattern calculated through the target vehicle-speed calculation processing R2 is managed by the optimal target vehicle-speed database R3, and a target vehicle-speed until the arrival at a certain section is acquired from the next point target vehicle-speed acquisition R13, thereby being used in the target control volume computation unit R1. It may depend on the elements of real-time characteristics in controlling, but there is a need to consider that the optimal target vehicle-speed database R3 is held in a memory in the integrated controller so as not to be affected by a communication delay or a searching time when acquiring data.

A below-described route passing speed pattern which is calculated on the infrastructure server side (the information processing apparatus side) illustrated in FIG. 6 minimizes consumption energy for all the vehicles in consideration of the prospective traffic congestion information, and the optimal target vehicle-speed pattern herein optimizes a single vehicle's movement such as the energy consumption of the vehicle, the riding comfort, and the safety, thereby having objectives different from each other.

The input route passing vehicle-speed pattern, is converted into a post-adjustment target vehicle-speed pattern by the target vehicle-speed pattern adjustment processing R14. The conversion method will be described later with reference to FIG. 15.

Based on the post-adjustment target vehicle-speed pattern, a movement of the vehicle when traveling in the post-adjustment target vehicle-speed pattern is computed through the vehicle movement calculation processing R15, thereby acquiring acceleration in a longitudinal direction (a_long), acceleration in a lateral direction (a_lat), a distance to an obstacle in the longitudinal direction (d_long), and a distance to the obstacle in the lateral direction (d_lat).

The energy consumption evaluation value calculation R8 inputs a target speed (v) and the acceleration in the longitudinal direction (a_long) acquired from the post-adjustment target vehicle-speed pattern, thereby calculating an energy consumption evaluation value.

The energy consumption evaluation value is computed so as to cause the evaluation value to be increased as the energy using volume decreases.

In addition, the riding comfort evaluation value calculation R9 inputs the acceleration in the longitudinal direction (a_long) and the acceleration in the lateral direction (a_lat), thereby calculating a riding comfort evaluation value.

The riding comfort evaluation value is computed so as to cause the evaluation value to be increased as the rapid change in the acceleration determining the riding comfort decreases.

The safety evaluation value calculation R10 inputs the acceleration in the longitudinal direction (a_long), the acceleration in the lateral direction (a_lat), the distance to the obstacle in the longitudinal direction (d_long), the distance to the obstacle in the lateral direction (d_lat), and the target speed (v) acquired from the post-adjustment target vehicle-speed pattern, thereby calculating a safety evaluation value.

The safety evaluation value is computed so as to cause the evaluation value to be increased as risks such as a collision with the obstacle or a sideslip on the curved road decrease.

In general, the evaluation functions of the target vehicle-speed calculation processing R2 are used in the processing for calculating the optimal target vehicle-speed pattern so as to cause the evaluation value to become the maximum, in consideration of the energy consumption, the riding comfort, the safety, and the like. Through the general evaluation value calculation R11, the optimal target vehicle-speed, pattern is generally calculated as the evaluation value J_vehicle based on each result of the evaluation value calculation processing and the horizon length (T) acquired from the infrastructure server.

The above-described evaluation functions can be represented by Expression 1. The definitions for the energy consumption (fuel), the riding comfort (comfort), and the safety (safe) in Expression 1 respectively correspond to the energy consumption evaluation value calculation R8, the riding comfort evaluation value calculation R9, and the safety evaluation value calculation R10 in FIG. 7, and the outputs are respectively calculated as the evaluation values such as the energy consumption evaluation value, the riding comfort evaluation value, and the safety evaluation value.

[Expression 1]

[Expression 1]

$$J_{vehicle} = \int_{t}^{t+T} (w_1 \text{ Fuel}(v, a_{long}, \ldots) + w_2 \text{ Comfort}(a_{long}, a_{lat}, \ldots) + w_3 \text{ Safe}(a_{long}, a_{lat}, d_{long}, d_{lat}, v, \ldots))dt \quad (1)$$

As the definitions of the energy consumption (fuel), the riding comfort (comfort), and the safety (safe) illustrated in Expression 1, it is assumed that values obtained by being respectively multiplied by the weight parameters of w1, w2, and w3 and the element to which the multiplied result is added from a certain time t to the t+horizon length T are integrated, thereby ultimately calculating the evaluation value J_vehicle.

In this manner, by using the horizon length calculated in the infrastructure server in Expression 1, with respect to the optimal route predicting the prospective traffic congestion which is calculated on the infrastructure server side, it is possible to conduct traveling in further consideration of the energy consumption, the riding comfort, and the safety of the single vehicle.

In addition, the aforementioned weight parameters denote the parameters representing the degree of priority in the energy consumption, the riding comfort, and the safety. For example, when the weight of w1 is increased so as to be greater than those of w2 and w3, the energy consumption can be controlled with a tendency of being decreased. Moreover, when the weight of w2 is increased so as to be greater than those of w1 and w3, the riding comfort can be controlled with a tendency of being improved. The weights need to be tuned in accordance with the sense of the driver.

The definitions for the functions such as the energy consumption, the riding comfort, and the safety in Expression 1 may be limited by cutting any one thereof depending on a purpose, or a new item may be added thereto. Moreover, the weights themselves of w1, w2, and w3 may be rearranged in a new expression so as to allow the weights to vary.

The evaluation value J_vehicle calculated with the evaluation functions is used to adjust the target vehicle-speed pattern through the target vehicle-speed pattern adjustment processing R14 in FIG. 7 and is calculated repeatedly until the optimal target vehicle-speed pattern in which the value of J_vehicle becomes the greatest is acquired. The flow of processing (FIG. 11) until the optimal target vehicle-speed pattern is acquired will be described later.

Since the optimal target vehicle-speed pattern calculated through the target vehicle-speed calculation processing R2 is the vehicle-speed within a certain distance, all of the patterns are not used at a time while performing controlling. Therefore, the optimal target vehicle-speed patterns are held in the optimal target vehicle-speed database R3 first. Then, only the target vehicle-speed in the necessary section is acquired through the next point target vehicle-speed acquisition R13, thereby being transferred to the target control volume calculation unit R1.

Figure 8:
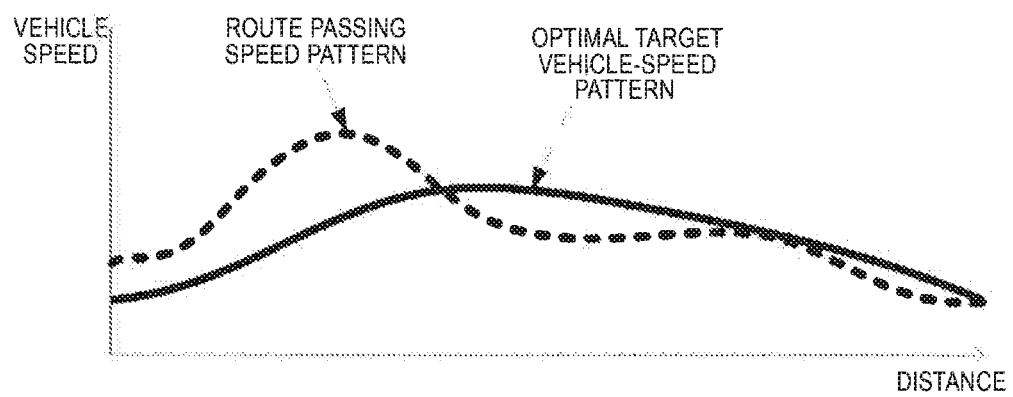
FIG. 8 is a diagram illustrating a conversion example from the route passing speed pattern to an optimal target vehicle-speed pattern of the present invention.

FIG. 8 illustrates an example of calculating the optimal target vehicle-speed pattern based on the route passing vehicle-speed pattern acquired from the infrastructure server. In FIG. 8, the route passing speed pattern is converted into an optimal target speed pattern so as to minimize the value of J_vehicle calculated through Expression 1, thereby realizing optimal controlling for the single vehicle. In FIG. 8, the operation of the route passing vehicle-speed pattern exhibits a shape having two convexities. However, it is assumed that controlling is performed gently as shown in the optimal target vehicle-speed pattern in consideration of the riding comfort and the safety.

Controlling for the single vehicle is converted into the target acceleration through the target acceleration calculation R4 by using the next point target vehicle-speed acquired from the next point target vehicle-speed acquisition R13 illustrated in FIG. 7 so as to follow after the optimal target vehicle-speed pattern which calculated as shown in FIG. 8. Then, a value to which the target acceleration and travel resistance are added through the target torque calculation R5 is multiplied by the vehicle weight and the radius of tire, thereby calculating the target torque. Based on the calculated target torque, the throttle-opening and the brake fluid pressure are calculated through the throttle-opening calculation R6 and the brake fluid pressure calculation R7. The throttle-opening and the brake fluid pressure after being calculated are respectively transmitted to the engine controller and the brake controller, thereby controlling the vehicle.

Figure 11A:
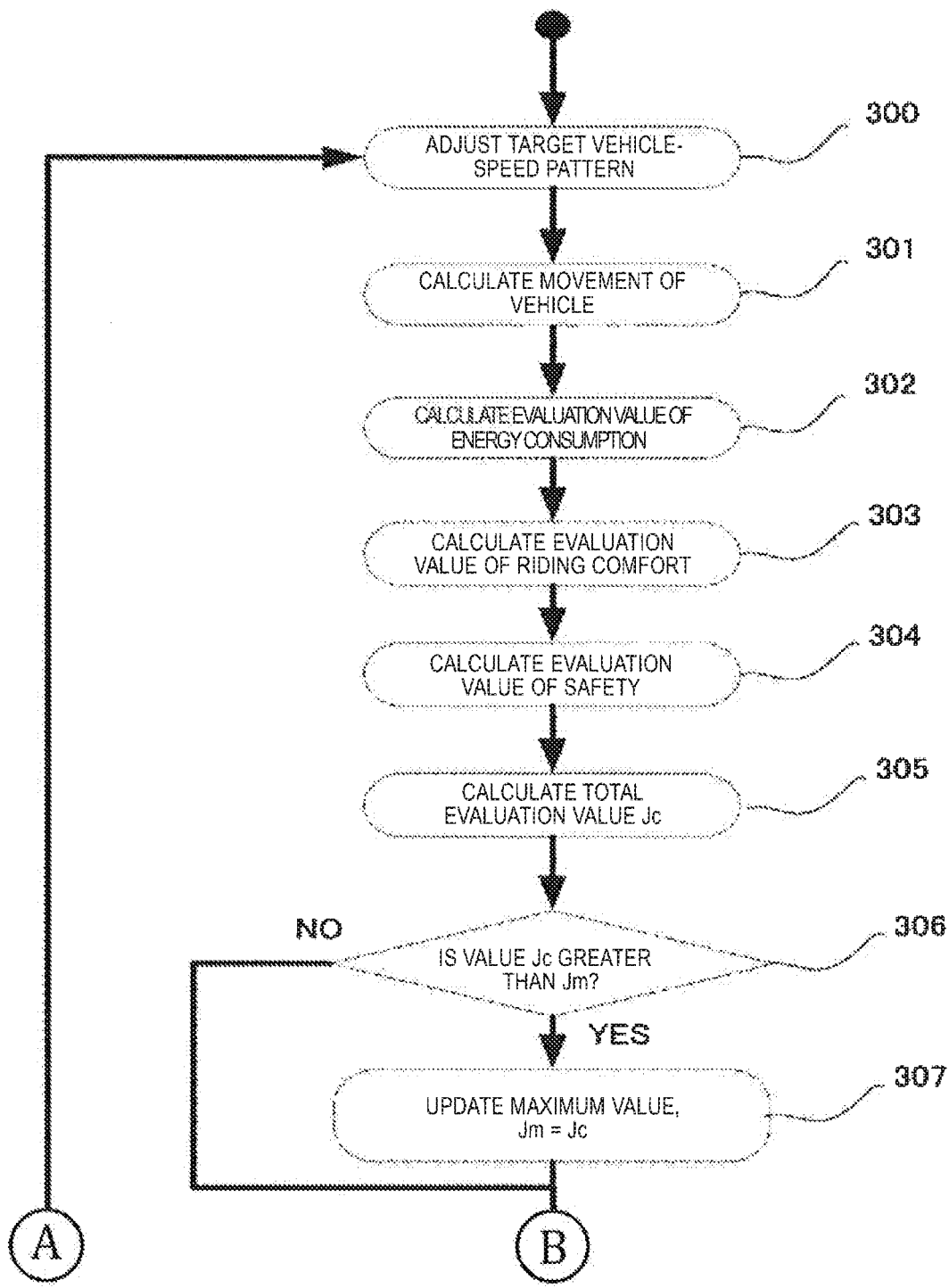
FIGS. 11A and 11B are diagrams of a flow illustrating the optimization processing of the optimal target vehicle-speed pattern of the integrated controller for the vehicles of the present invention.
Figure 11B:
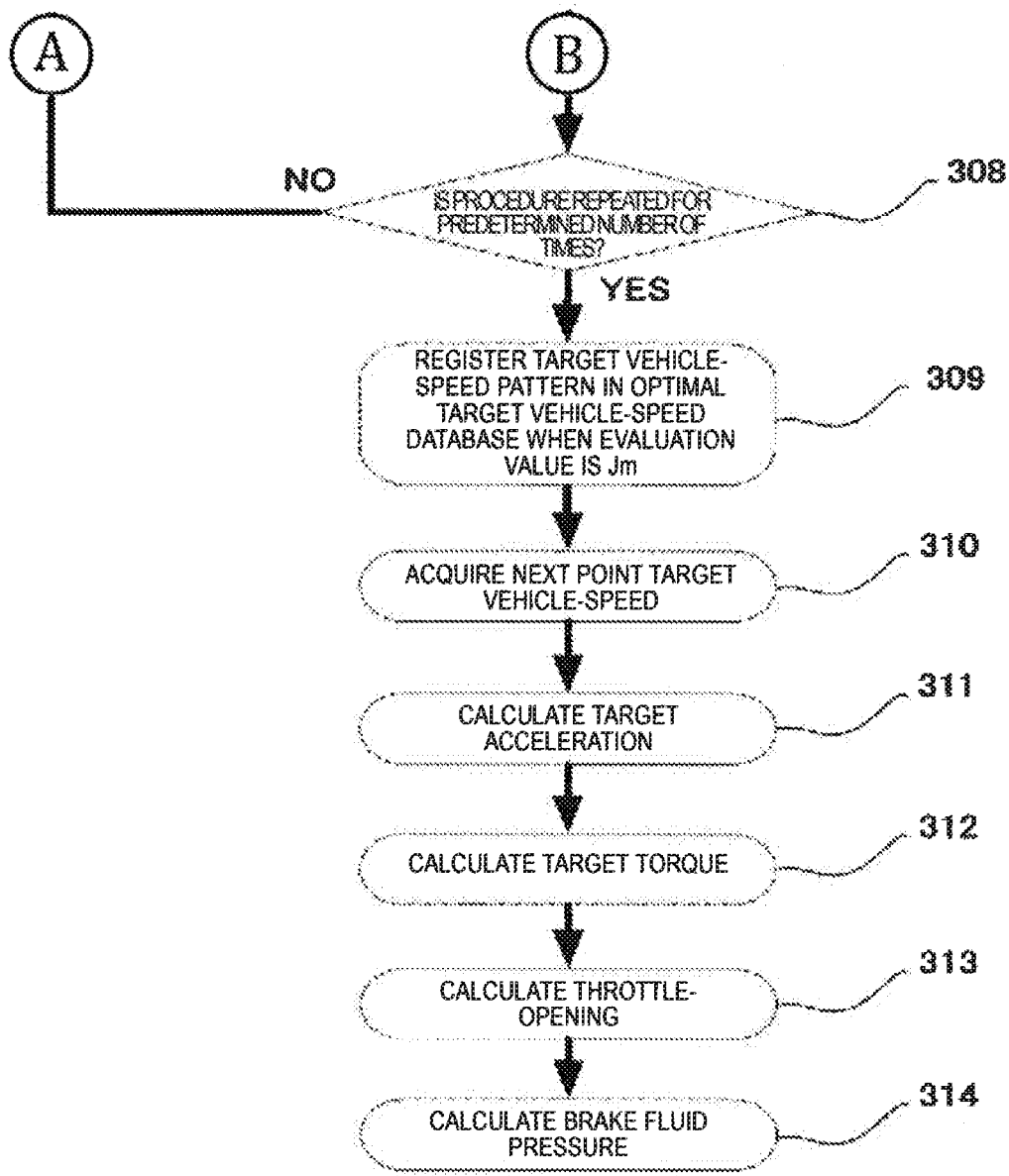

FIG. 11 illustrates a flow including a logic which repeats the energy consumption evaluation value calculation R8, the riding comfort evaluation value calculation R9, the safety evaluation value calculation R10, the general evaluation value calculation R11, and the extraction R12 of the target vehicle-speed pattern in which the value of J_vehicle becomes the greatest, in FIG. 7.

Figure 15:
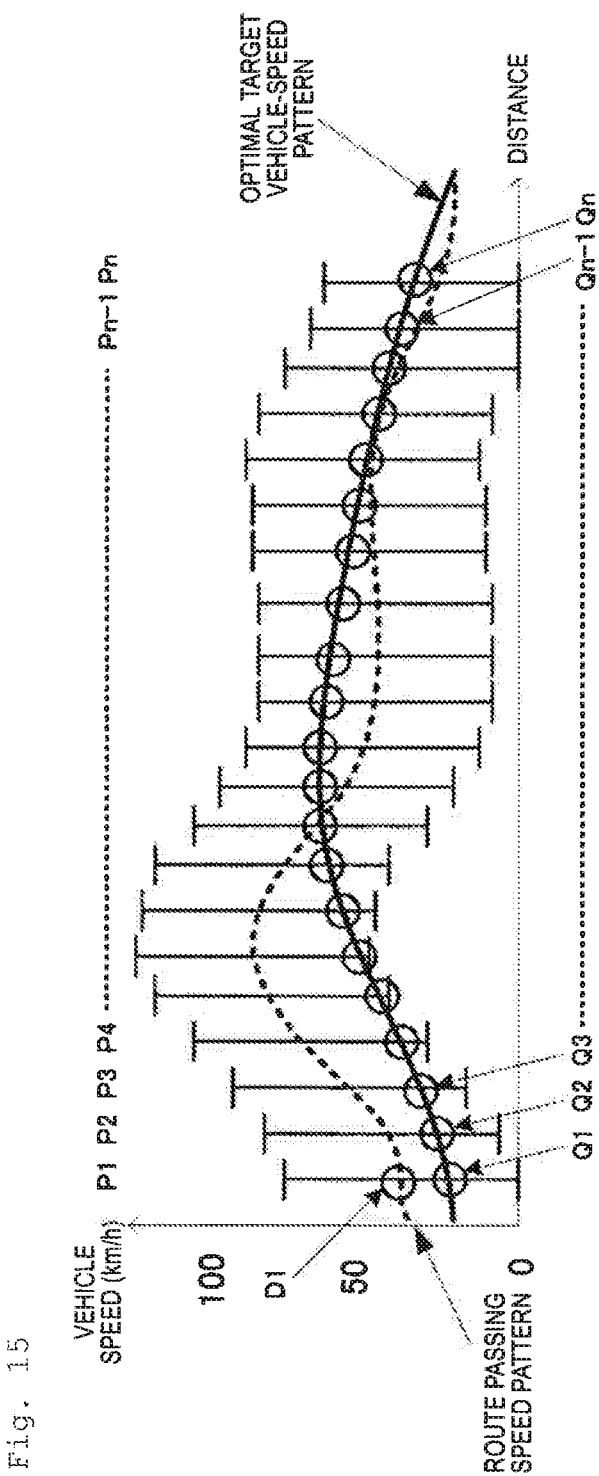
FIG. 15 is a diagram illustrating an example of an adjustment of the optimal target vehicle-speed pattern of the present invention.

First, the target vehicle-speed pattern to be evaluated is generated through target vehicle-speed pattern adjustment processing 300. The target vehicle-speed pattern which is adjusted herein is set as illustrated in the example of FIG. 15. In FIG. 15, the examples of the route passing speed pattern and the optimal target vehicle-speed pattern illustrated in FIG. 8 are uniformly divided into the distances P1 to Pn. The parameters adjusted through the target vehicle-speed pattern adjustment processing 300 correspond to the combinations of the target vehicle-speeds of P1 to Pn in FIG. 15. For example, in a case of the distance of P1, an adjustment value of the target vehicle-speed is determined to be set to which speed within a range from a predetermined negative speed to a predetermined positive speed based on a speed D1 of the route passing speed pattern in the distance P1. The procedure is repeated from P1 to Pn so as to generate combinations of the target vehicle-speeds from P1 to Pn, and the distances from P1 to Pn are smoothly connected together, thereby achieving the target vehicle-speed pattern. The reason for setting the next target vehicle-speed in the value within the range from a predetermined negative speed to a predetermined positive speed based on the speed of the route passing speed pattern is that the energy consumption of all the vehicles is in consideration on the infrastructure server side and the vehicle is controlled so as not to be significantly deviated from the route passing speed pattern.

Subsequently, by using the target vehicle-speed pattern calculated through the target vehicle-speed pattern adjustment processing 300, a movement of the vehicle is calculated in a vehicle movement calculation 301. By calculating a movement of the vehicle, the acceleration in the lateral direction, the acceleration in the longitudinal direction, the distance to the obstacle in the lateral direction, and the distance to the obstacle in the longitudinal direction can be acquired. The acceleration, the distance, and the target vehicle-speed pattern which vary due to influences of the road shape, a preceding vehicle, the obstacle, and the like are input to the evaluation functions in FIG. 7. The ultimately calculated optimal target vehicle-speed pattern denotes the combinations of the target vehicle-speeds from P1 to Pn in which the evaluation value of J_vehicle becomes the greatest. Accordingly, optimal inputs of the combinations of the target vehicle-speeds from Q1 to Qn in FIG. 15 are smoothly connected together.

Subsequently, based on the target vehicle-speed patterns calculated through the target vehicle-speed pattern adjustment processing 300 and the acceleration in the longitudinal direction calculated through the vehicle movement calculation processing 301, the energy consumption evaluation value is calculated through energy consumption evaluation value calculation processing 302. In addition, based on the acceleration in the longitudinal direction and the acceleration in the lateral direction, the riding comfort evaluation value is calculated through riding comfort evaluation value calculation processing 303. Moreover, based, on the target vehicle-speed pattern, the distance to the obstacle in the longitudinal direction, the distance to the obstacle in the lateral direction, and the acceleration in the lateral direction which are calculated through the target vehicle-speed pattern adjustment processing 300, the safety evaluation value is calculated through safety evaluation value calculation processing 304.

Based on the calculated evaluation values, the evaluation value is calculated through general evaluation value Jc calculation processing 305. It is determined whether or not the calculated evaluation value Jc is greater than a value Jm calculated in the past (306). When the value Jc is greater, the evaluation value Jm is updated (307). When the value Jc is smaller, the evaluation value Jm is not updated. The procedure from the target vehicle-speed pattern adjustment processing 300 to updating of the maximum value (307) is repeated for a predetermined number of times. After determining that the procedure is repeated for a predetermined number of times (308), when the procedure is completed, the target vehicle-speed pattern in the case of the evaluation value Jm is registered in the optimal target vehicle-speed database as the optimal target vehicle-speed pattern (309).

The next point target vehicle-speed is acquired from the optimal target vehicle-speed database 13 through next point target vehicle-speed acquisition processing 310, thereby calculating the target acceleration through target acceleration calculation processing 311. Subsequently, the calculated target acceleration and travel resistance are added through target torque calculation processing 312, and the vehicle weight is multiplied by the radius of the tire, thereby calculating the target torque. Based on the calculated target torque, the throttle-opening and the brake fluid pressure are calculated through throttle-opening calculation processing 313 and brake fluid pressure calculation processing 314.

As described above, the travel control device according to the present invention includes the target vehicle-speed calculation units (R2 and 12) which include the target vehicle-speed pattern adjustment processing 300 generating the target vehicle-speed pattern based on the route passing-speed pattern which is the passing vehicle-speed pattern within a certain distance generated in consideration of the traffic congestion information, and the evaluation value calculation units (the energy consumption evaluation value calculation processing 302, the riding comfort evaluation value calculation processing 303, the safety evaluation value calculation processing 304, and the general evaluation value calculation processing 305) calculating the evaluation values (the energy consumption evaluation value, the riding comfort evaluation value, the safety evaluation value, and the like) based on the horizon length T which represents the time taken until the vehicle arrives at the ultimate point generated in consideration of the information on the prospective traffic congestion which can occur in the future and calculating the evaluation value based on the target vehicle-speed pattern; and the target control volume computation units (R1 and 13) that calculate the control volume of controlling the vehicle based on the evaluation value.

Figure 9:
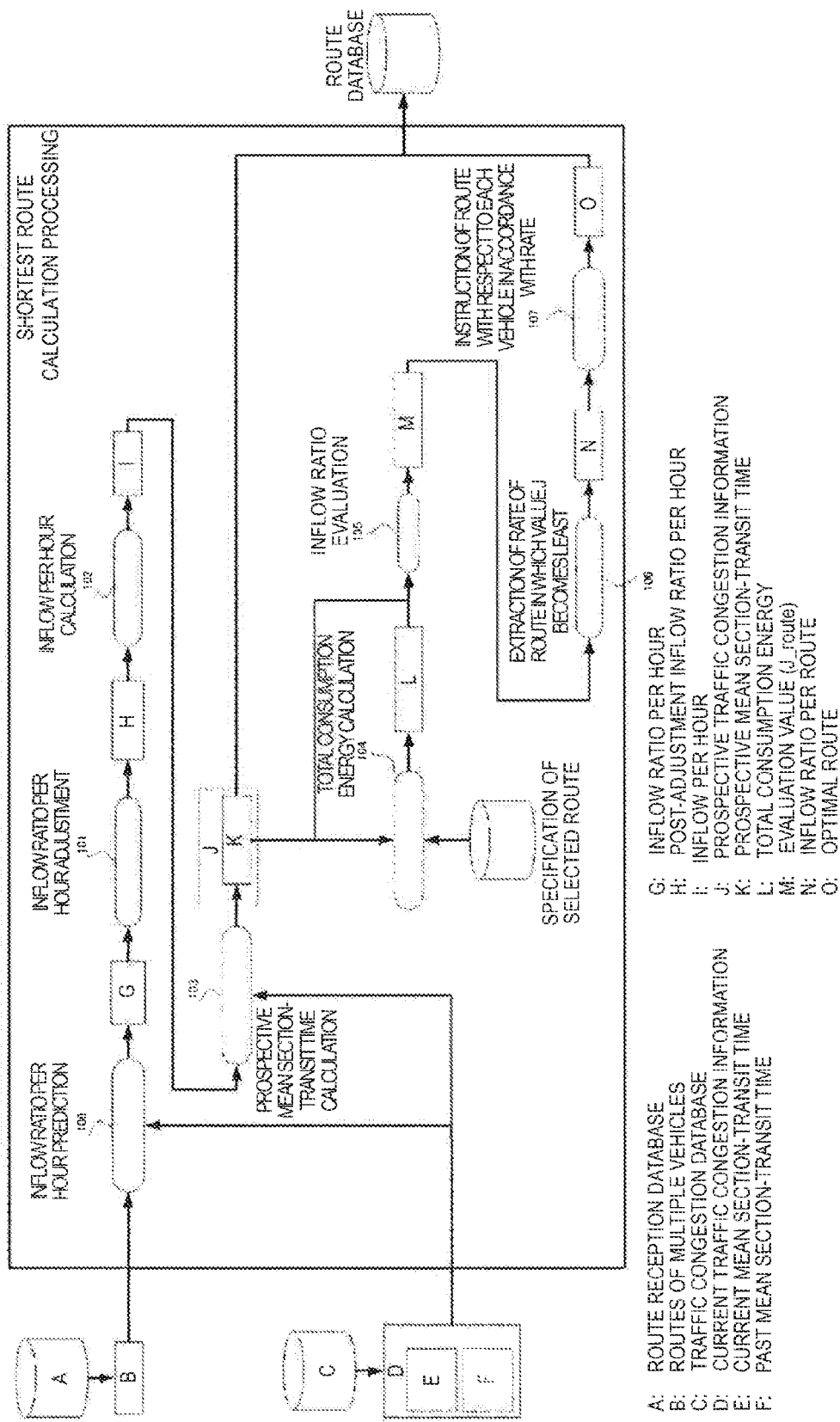
FIG. 9 is a diagram illustrating one configuration example of shortest route calculation processing of the present invention.

FIG. 9 illustrates the detailed configuration of the shortest route calculation processing 4 in FIG. 6.

The shortest route calculation processing 4 is configured to include inflow ratio per hour prediction processing 100, inflow ratio per hour adjustment processing 101, inflow per hour calculation processing 102, prospective mean section-trans it time calculation processing 103, total consumption energy calculation processing 104, inflow ratio evaluation processing 105, processing 106 of extracting the inflow ratio per hour in which the value J becomes the least, and processing 107 of instructing each vehicle with the route in accordance with the rate.

Figure 13:
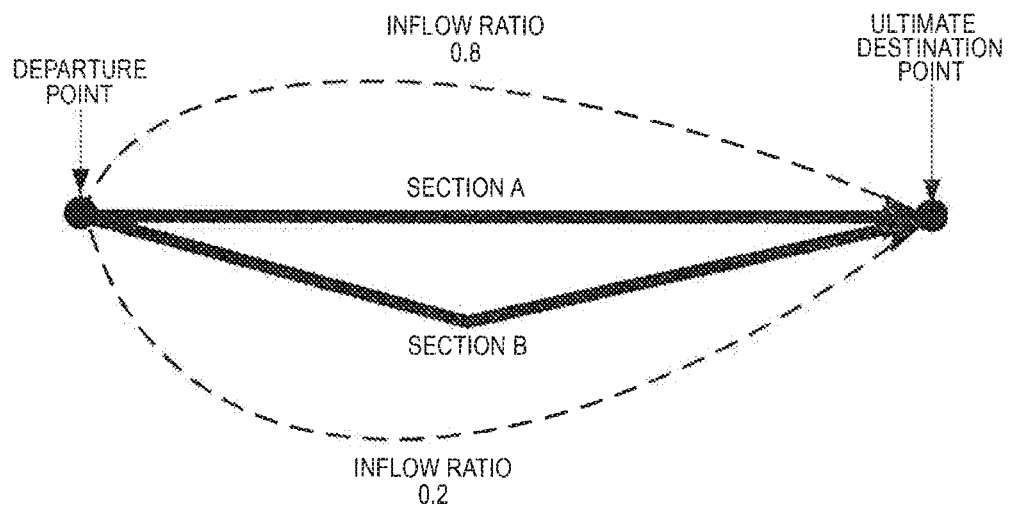
FIG. 13 is a diagram illustrating an example of the inflow ratio of the vehicles of the present invention.

The inflow ratio herein is a ratio allocated to a certain section on the route while indicating a ratio of the vehicles passing through a certain section with respect to ail the vehicles in the multiple routes through which the vehicles having the same destination pass. For example, as illustrated in FIG. 13, in the sections A and B between the departure point of the route and the ultimate destination point, when 80 percent of all the vehicles pass through the section A, the inflow ratio of the section A becomes 0.8. In addition, since the remaining 20 percent of all the vehicles travel the section B, the inflow ratio thereof becomes 0.2.

Subsequently, the inflow ratio per hour represents an inflow ratio at each hour since the ratio of the number of the vehicles passing through a certain section varies in each time zone, from the starting time of the vehicle. For example, as illustrated in FIG. 14(C), the inflow ratio per hour is obtained by dividing the time zone from 00:00 to 23:00 by a certain uniform time for the inflow ratio. The inflow ratio is 0.8 at the time of 06:00, but the vehicles passing through the section A decrease at the time of 09:00 so that the inflow ratio becomes 0.2.

The routes of the multiple vehicles in the route reception database 3 and the current traffic congestion information in the traffic congestion database 7 are input through the shortest route calculation processing 4, thereby output ting the prospective traffic congestion, information and the optimal route. The current traffic congestion information includes the current mean section-transit time, the past mean section-transit time, and the like. The prospective traffic congestion information includes the prospective mean section-transit time. As the optimal route, the inflow ratio per hour is obtained so as to minimize the evaluation value J_route calculated through the inflow ratio evaluation processing 105 based on the prospective mean section-transit time and the total consumption energy, thereby generating a route through which the vehicle travels, based on the inflow ratio.

In addition, the optimal route calculated herein is held in the route database 5. As illustrated in FIG. 6, the held optimal route is transmitted to the in-vehicle terminal on the vehicle side, and the driver selects whether or not to drive as directed.

In addition, as shown in FIG. 6, since the calculated prospective traffic congestion information (the prospective mean section-transit time) is input through the horizon length calculation processing, the prospective traffic congestion information (the prospective mean section-transit time) is also held in the route database.

Based on the routes of the multiple vehicles acquired from the route reception database 3, it is possible to determine the rate of all the vehicles traveling each route, in advance. In addition, since the current mean section-transit time and the past mean section-transit time included in the current traffic congestion information obtained from the traffic congestion database 7 are grasped, it is possible to predict the inflow ratio per hour for each section through the inflow ratio per hour prediction processing 100.

Subsequently, when performing adjustment processing of the inflow ratio per hour, the inflow ratio per hour is adjusted through the inflow ratio per hour adjustment processing 101 in order to search for the optimal route. When adjusting the inflow ratio per hour, if a certain section exhibits the significant inflow ratio, the inflow ratio is distributed to other sections so as to cause the overall inflow ratio to be low.

Figure 14:
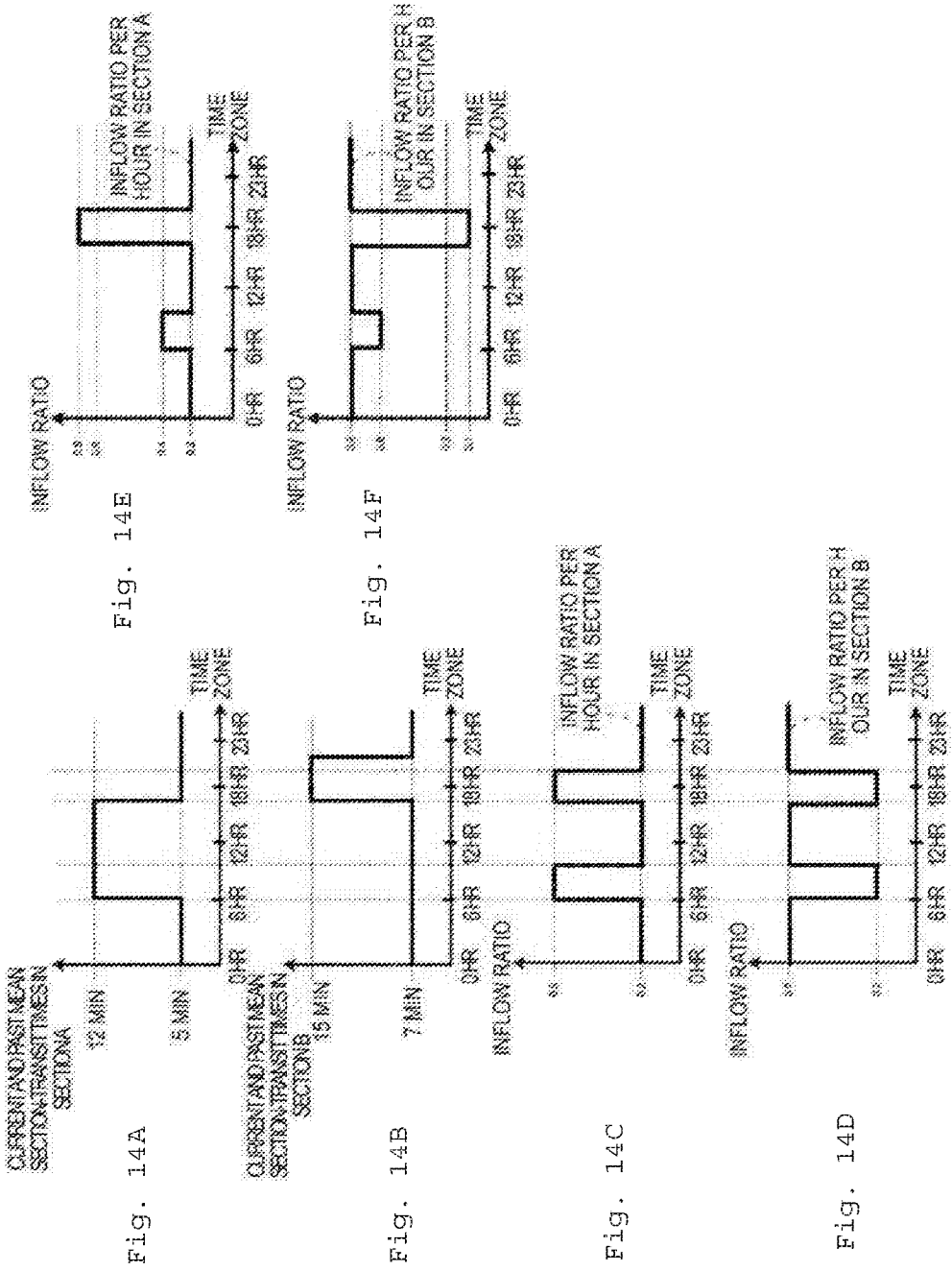
FIGS. 14A-14F are diagrams illustrating an example of the inflow ratio of the vehicles per hour of the present invention.

Descriptions will be given regarding the adjustment of the inflow ratio per hour by exemplifying a case in which the mean section-transit time and the inflow ratio in FIG. 14 are acquired in the route illustrated in FIG. 13.

FIGS. 14(A) and 14(B) illustrate the mean section-transit time for each time zone calculated based on the current and past mean section-transit times respectively in the sections A and B. In FIG. 14(A), the route is congested from 06:00 before 18:00 so that it requires average of 12 minutes to pass through, whereas it normally takes average of 5 minutes to be able to pass through.

In addition, in FIG. 14(B), the route is congested from before 18:00 till 20:00, so that it requires average of 15 minutes to pass through, whereas it normally takes average of 7 minutes to be able to pass through.

FIGS. 14(C) and 14(D) are examples of the inflow ratio per hour respectively in the sections A and B. As shown in FIG. 14(C), it is learned that the inflow ratio in the section A from 06:00 before 12:00 is 0.8. As shown in FIG. 14(A) as well, it is learned that a number of vehicles tend to pass through the section A in a wide time zone of which the mean section-transit time is 12 minutes.

In this case, as shown in FIG. 14(D), since less vehicles pass through the section B than the section A, there is spatial allowance on the road to travel so that it takes 12 minutes of the mean transit time in the section A, but it takes 7 minutes of the same in the section B. Therefore, the vehicle considering the section A as the route to travel based on the apparatus on the infrastructure server side is urged to travel the section B, and thus, it is possible to minimize the consumption energy and the mean section-transit time.

For example, the inflow ratio from 06:00 before 12:00 in FIG. 14(C) is adjusted to be lowered from 0.8 to 0.4 as that in FIG. 14(E), and the inflow ratio from 06:00 before 12:00 in FIG. 14(D) is adjusted to be raised from 0.2 to 0.6 as that in FIG. 14(F). The aforementioned contents are the method of adjusting the inflow ratio per hour through the inflow ratio per hour adjustment processing 101 in order to search for the optimal route.

Subsequently, based on the adjusted inflow ratio per hour, the inflow per hour is calculated through the inflow per hour calculation processing 102. Through the inflow per hour calculation processing 102, it is possible to grasp the total number of vehicles intending to travel the route based on the routes of the multiple vehicles held in the route reception database 3. Therefore, the inflow ratio per hour is multiplied by the number of vehicles traveling per hour, and thus, the inflow per hour can be calculated.

Based on the inflow per hour, and the current mean section-transit time and the past mean section-transit time included in the current traffic congestion information of the traffic congestion database 7, the prospective mean section-transit time in each section is calculated through the prospective mean section-transit time calculation processing 103 included in the prospective traffic congestion information. The reason for calculating the prospective mean section-transit time is that since the inflow per hour in the route is different from the route of the multiple vehicles acquired from the route reception database 3 through the inflow ratio per hour adjustment processing 101, unless the variation of the prospective mean section-transit time is computed based on the changed route and the current traffic congestion information, it is not possible to calculate the total consumption energy taking traffic congestion into consideration.

Based on the specification of the route selected to be the prospective mean section-transit time, the total consumption energy is calculated through the total consumption energy calculation processing 104. The specification of the selected route denotes the parameters affecting the consumption energy of the vehicle such as travel resistance of the road, the type of the road such as an expressway and an ordinary road, the distance of the route, and the road shape such as the curve curvature. Since there is an existing method regarding the method of calculating the consumption energy, the descriptions thereof will be omitted herein.

When evaluating the inflow ratio, the prospective mean section-transit time (duration of car) and the total consumption energy (amount of energy of car) calculated through the prospective mean section-transit time calculation processing 103 and the total consumption energy calculation processing 104 are added with the weight parameters of w1 and w2 as represented in Expression 2, and are integrated from t to t+the horizon length T, thereby calculating the evaluation value (J_route) through the inflow ratio evaluation processing 105. The horizon length T herein has the same meaning of that which is calculated through the horizon length calculation processing 10 in FIG. 6.

[Expression 2]

[Expression 2]

$$J_{route} = \int_{t}^{t+T} (w_1 DurationOfCar + w_2 AmountEnergyOfCar) dt \quad (2)$$

Thereafter, the inflow ratio per hour in which the evaluation value J_route obtained through the inflow ratio evaluation processing 105 becomes the least is selected through the processing 106 of extracting the inflow ratio per hour. In order to calculate the inflow rate for each section in which the evaluation value becomes the least, there is a need to repeat the procedure from the inflow ratio per hour adjustment processing 101 to the inflow ratio evaluation processing 105 for several times. The logic will be described later with reference to FIG. 10.

Based on the optimal inflow ratio per hour selected through the processing 106 of extracting the inflow ratio per hour in which the value J becomes the least, allocation of the vehicles with respect to the routes is calculated through the route allocation processing 107 through which each of the vehicles is instructed with the route. Ultimately, the route calculated through the processing 107 through which each of the vehicles is instructed with the route becomes the optimal route. Eventually, the optimal route and the prospective mean section-transit time are held in the route database 5.

Figure 10:
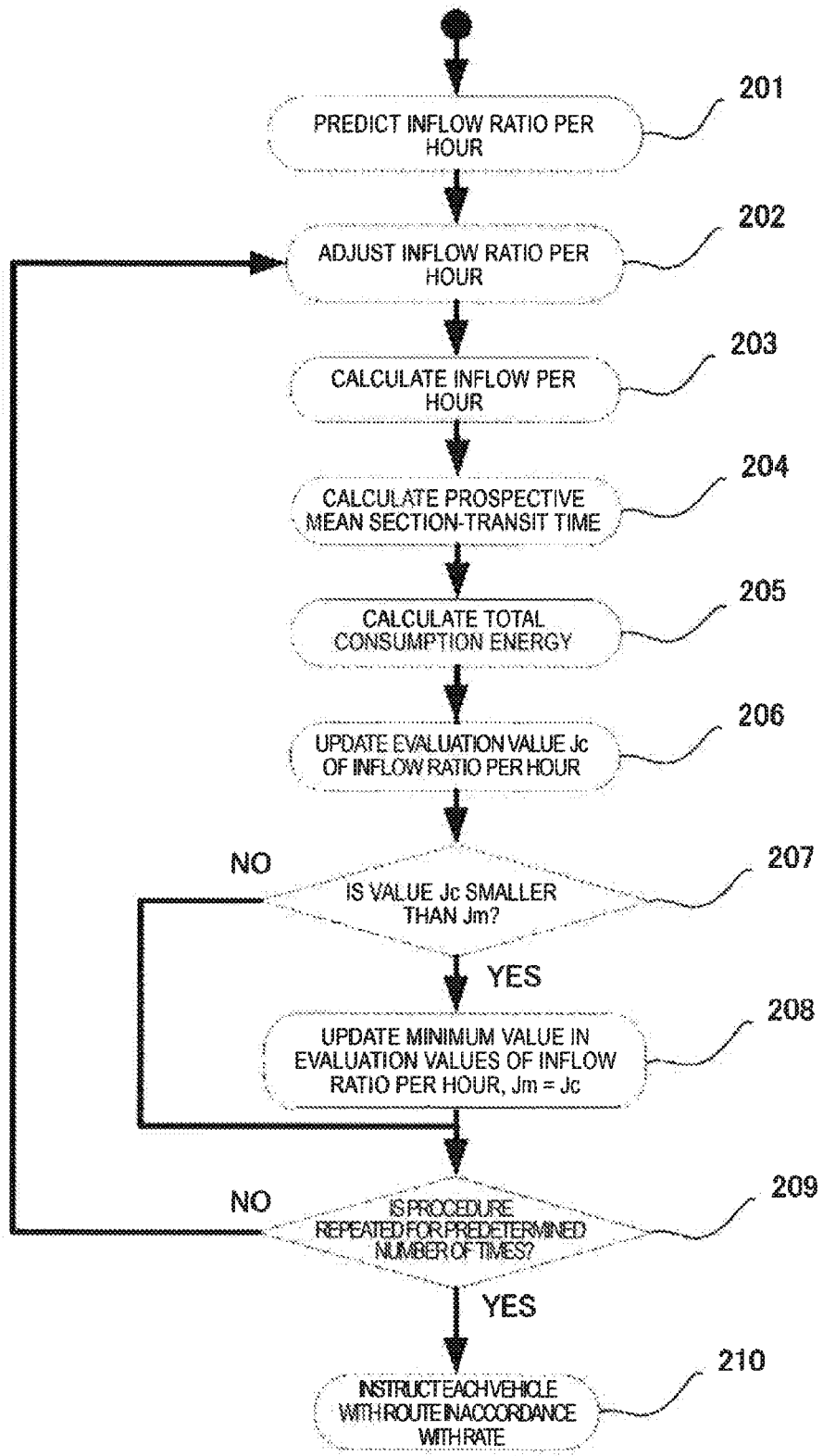
FIG. 10 is a diagram of a flow illustrating optimization processing of an inflow ratio in the shortest route calculation processing of the present invention.

FIG. 10 illustrates a flew including a logic repeating the procedure from the inflow ratio per hour adjustment processing 101 to the inflow ratio evaluation processing 105. As illustrated in FIG. 9 as well, inflow ratio per hour prediction processing 201 is performed based on the route of the multiple vehicles acquired from the route reception database 3.

Subsequently, inflow ratio per hour adjustment processing 202 is executed with respect to the inflow ratio per hour calculated through the inflow ratio per hour prediction processing 201. Then, when the inflow ratio per hour is confirmed, it is possible to know the number of vehicles passing through the route each hour. Therefore, subsequently, the inflow per hour is calculated through inflow per hour calculation processing 203.

By using the inflow per hour, and the current mean section-transit time and the past mean section-transit time included in the current traffic congestion information of the traffic congestion database 7, the prospective mean section-transit time is calculated through prospective mean section-transit time calculation processing 204.

By using the specification of the route which is selected as the prospective mean section-transit time, the total consumption energy of all the vehicles is calculated through total consumption energy calculation processing 205. Subsequently, by using the total consumption energy and the prospective mean section-transit time, the evaluation value Jc is calculated through evaluation value Jc calculation processing 206 of the inflow ratio per hour. It is determined whether or not the evaluation value Jc is smaller than the evaluation value Jm (207). In other words, the calculated evaluation value Jc is compared to the evaluation value Jm which is the least at the moment, and the smaller evaluation value is selected through processing 208 of updating the minimum value in the evaluation values of the inflow ratio per hour, thereby updating the minimum value in the evaluation value of the inflow ratio per hour.

The procedure from the inflow ratio per hour adjustment processing 202 to processing 208 of updating the minimum value in the evaluation values of the inflow ratio per hour is determined whether to be repeated for a predetermined number of times (209), and the inflow ratio per hour is adjusted through the inflow ratio per hour adjustment processing 202, thereby searching for the inflow ratio in which the evaluation value becomes the least. When the inflow ratio in which the evaluation value becomes the least can be calculated, it is possible to plan which route the vehicle is to travel. Therefore, in accordance with the rate of the inflow ratio, the route used by each vehicle is calculated, thereby instructing the in-vehicle terminal on the vehicle side (210).

REFERENCE SIGNS LIST

1 IN-VEHICLE TERMINAL
2 ROUTE RECEPTION PROCESSING
3 ROUTE RECEPTION DATABASE
4 SHORTEST ROUTE CALCULATION PROCESSING
5 ROUTE DATABASE
6 TRAFFIC CONGESTION INFORMATION ACQUISITION PROCESSING
7 TRAFFIC CONGESTION DATABASE
8 ROUTE PASSING VEHICLE-SPEED CALCULATION PROCESSING
9 PASSAGE VEHICLE-SPEED DATABASE
10 HORIZON LENGTH CALCULATION PROCESSING
11 HORIZON LENGTH DATABASE
12 TARGET VEHICLE-SPEED CALCULATION PROCESSING
13 OPTIMAL TARGET VEHICLE-SPEED DATABASE
14 TARGET CONTROL VOLUME COMPUTATION UNIT
15 ENGINE CONTROLLER
16 BRAKE CONTROLLER
17 INTEGRATED CONTROLLER

The invention claimed is:
1. A travel control device comprising:
a target vehicle-speed calculation unit that includes a target vehicle-speed pattern adjustment processing unit generating a target vehicle-speed pattern based on a route passing speed pattern which is a passing vehicle-speed pattern within a certain distance generated in consideration of traffic congestion information, and an evaluation value calculation unit calculating an evaluation value based on a horizon length and the target vehicle-speed pattern, the horizon length representing the time taken until a vehicle arrives at an ultimate point generated in consideration of information on prospective traffic congestion which can occur in the future; and a target control volume computation unit that calculates control volume of controlling the vehicle based on the evaluation value.

2. The travel control device according to claim 1, further comprising:

a vehicle movement calculation unit that calculates vehicle movement based on the target vehicle-speed pattern, wherein the evaluation value calculation unit includes an energy consumption evaluation value calculation processing unit which calculates an energy consumption evaluation value based on the target vehicle-speed pattern and the vehicle movement, and the evaluation value is calculated by using the energy consumption evaluation value.

3. The travel control device according to claim 2, wherein the evaluation value calculation unit includes a riding comfort evaluation value calculation processing unit which calculates a riding comfort evaluation value based on the vehicle movement, and a safety evaluation value calculation processing unit which calculates a safety evaluation value based on the target vehicle-speed pattern and the vehicle movement, and wherein the evaluation value is calculated based on the horizon length, the energy consumption evaluation value, the riding comfort evaluation value, and the safety evaluation value.

4. The travel control device according to claim 1, wherein the target control volume computation unit includes a target acceleration calculation processing unit which calculates target acceleration based on an input next point target vehicle-speed, a target torque calculation processing unit which calculates target torque based on the target acceleration, a throttle-opening calculation processing unit which calculates throttle-opening based on the target torque, and a brake fluid pressure calculation processing unit which calculates brake fluid pressure based on the target torque.

5. The travel control device according to claim 1, wherein the traffic congestion information includes a current mean section-transit time and a past mean section-transit time, wherein the mean section-transit time is a mean transit time of the vehicle in one section which is acquired by dividing a predetermined route from a departure point to the ultimate destination point into multiple sections, and wherein the past mean section-transit time is a history of the mean transit time in a certain time zone.

6. A travel control system comprising:

an information processing apparatus that includes a shortest route calculation processing unit predicting prospective traffic congestion information based on an input route of a vehicle and current traffic congestion information and calculating optimal routes for all vehicles so as to minimize the energy consumption and arrival times at destinations of all the vehicles which pass through a prospective traffic congestion occurrence section based on the prospective traffic congestion information, a horizon length calculation processing unit calculating a horizon length which represents the time taken until the vehicle arrives at an ultimate point generated in consideration of the prospective traffic congestion information which can occur in the future based on the optimal route, and a route passing vehicle-speed calculation processing unit calculating a route passing vehicle-speed pattern based on the optimal route and the horizon length in a case of passing through a predetermined route; and a travel control device that includes a target vehicle-speed calculation unit having a target vehicle-speed pattern adjustment processing unit which generates a target vehicle-speed pattern based on the route passing speed pattern and an evaluation value calculation unit which calculates an evaluation value based on the horizon length and the target vehicle-speed pattern, and a target control volume computation unit calculating control volume for controlling the vehicle based on the evaluation value.

7. The travel control system according to claim 6, wherein the horizon length calculation processing unit calculates the horizon length based on the optimal route and the route passing vehicle-speed pattern, and wherein the route passing vehicle-speed calculation processing unit calculates the route passing vehicle-speed pattern based on the optimal route and the horizon length.

8. The travel control system according to claim 6, wherein the information processing apparatus includes a route reception processing unit which acquires estimated departure times, destinations, and routes leading to the destinations input from multiple vehicles.

9. The travel control system according to claim 6, wherein the information processing apparatus includes a route reception database which stores the estimated departure times, the destinations, and the routes leading to the destinations input from the multiple vehicles, a route database which holds the optimal route for the vehicle to travel and the prospective traffic congestion information, a traffic congestion database which holds the current traffic congestion information in multiple road sections, a passing vehicle-speed database which holds the route passing vehicle-speed pattern for each route through which the vehicle travels, and a horizon length database which holds the horizon length.

10. The travel control system according to claim 6, wherein the shortest route calculation processing unit includes an inflow ratio per hour prediction processing unit which predicts an inflow ratio of the vehicles per hour for each section based on the input routes of the multiple vehicles and the current traffic congestion information, an inflow per hour calculation processing unit which calculates an inflow of the vehicles per hour based on the inflow ratio per hour, a prospective mean section-transit time calculation processing unit which calculates a prospective mean section-transit time for each section based on the inflow of the vehicles and the current traffic congestion information, a total consumption energy calculation processing unit which calculates total consumption energy based on the prospective mean section-transit time and the route, an inflow ratio evaluation processing unit which calculates the evaluation value of the inflow ratio based on the prospective mean section-transit time and the total consumption energy, an inflow ratio per hour extraction processing unit which extracts the inflow ratio per hour in which the evaluation value of the inflow ratio becomes the least, and a route allocation processing unit which sets allocation of the optimal route with respect to each of the vehicles based on the extracted inflow ratio per hour.

11. The travel control system according to claim 6, wherein the traffic congestion information includes a current mean section-transit time and a past mean section-transit time, wherein the mean section-transit time is a mean transit time of the vehicle in one section which is acquired by dividing a predetermined route from a departure point to the ultimate destination point into multiple sections, and wherein the past mean section-transit time is a history of the mean transit time in a certain time zone.

12. The travel control system according to claim 6, wherein the travel control device includes a vehicle movement calculation unit which calculates vehicle movement based on the target vehicle-speed pattern, wherein the evaluation value calculation unit includes an energy consumption evaluation value calculation processing unit which calculates an energy consumption evaluation value based on the target vehicle-speed pattern and the vehicle movement, and wherein the evaluation value is calculated by using the energy consumption evaluation value.

13. The travel control system according to claim 6, wherein the evaluation value calculation unit of the travel control device includes a riding comfort evaluation value calculation processing unit which calculates a riding comfort evaluation value based on the vehicle movement, and a safety evaluation value calculation processing unit which calculates a safety evaluation value based on the target vehicle-speed pattern and the vehicle movement, and wherein the evaluation value is calculated based on the horizon length, the energy consumption evaluation value, the riding comfort evaluation value, and the safety evaluation value.

* * * * *